(12) United States Patent
Shiraki

(10) Patent No.: US 7,824,174 B2
(45) Date of Patent: Nov. 2, 2010

(54) METAL MOLD FOR BLOW MOLDING

(75) Inventor: Katsumi Shiraki, Fujisawa (JP)

(73) Assignee: NOK Corporation, Tokyo (JP)

( * ) Notice: Subject to any disclaimer, the term of this patent is extended or adjusted under 35 U.S.C. 154(b) by 465 days.

(21) Appl. No.: 11/922,260

(22) PCT Filed: May 29, 2006

(86) PCT No.: PCT/JP2006/310638

§ 371 (c)(1),
(2), (4) Date: Dec. 14, 2007

(87) PCT Pub. No.: WO2006/134768

PCT Pub. Date: Dec. 21, 2006

(65) Prior Publication Data

US 2009/0130245 A1     May 21, 2009

(30) Foreign Application Priority Data

Jun. 14, 2005   (JP) .............................. 2005-174046

(51) Int. Cl.
*B29C 49/48*  (2006.01)

(52) U.S. Cl. ....................................... 425/522; 425/533

(58) Field of Classification Search ................ 425/522, 425/533; 264/505, 506, 523, 537, 538
See application file for complete search history.

(56) References Cited

U.S. PATENT DOCUMENTS

| | | | |
|---|---|---|---|
| 4,724,116 A * | 2/1988 | Aoki | 264/537 |
| 4,852,891 A | 8/1989 | Sugiura et al. | |
| 5,236,656 A * | 8/1993 | Nakajima | 425/533 |
| 2005/0046078 A1* | 3/2005 | Sueoka et al. | 264/267 |

FOREIGN PATENT DOCUMENTS

| | | |
|---|---|---|
| JP | 5-2871 B2 | 1/1993 |
| JP | 2003-191317 A | 7/2003 |

* cited by examiner

*Primary Examiner*—Robert B Davis
(74) *Attorney, Agent, or Firm*—Harness, Dickey & Pierce, P.L.C.

(57) ABSTRACT

A metal mold for blow molding which may prevent a mold biting while maintaining a blowing performance and may mold a thermoplastic-elastomer article having a stable shape. In a blow molding metal mold provided with an annular loosely surrounding part for loosely surrounding an end part of a parison, a clearance between an outer peripheral surface of the end part and an inner peripheral surface of the loosely surrounding part at a parting line of the metal mold is larger than a clearance at the other parts than the parting line.

2 Claims, 10 Drawing Sheets

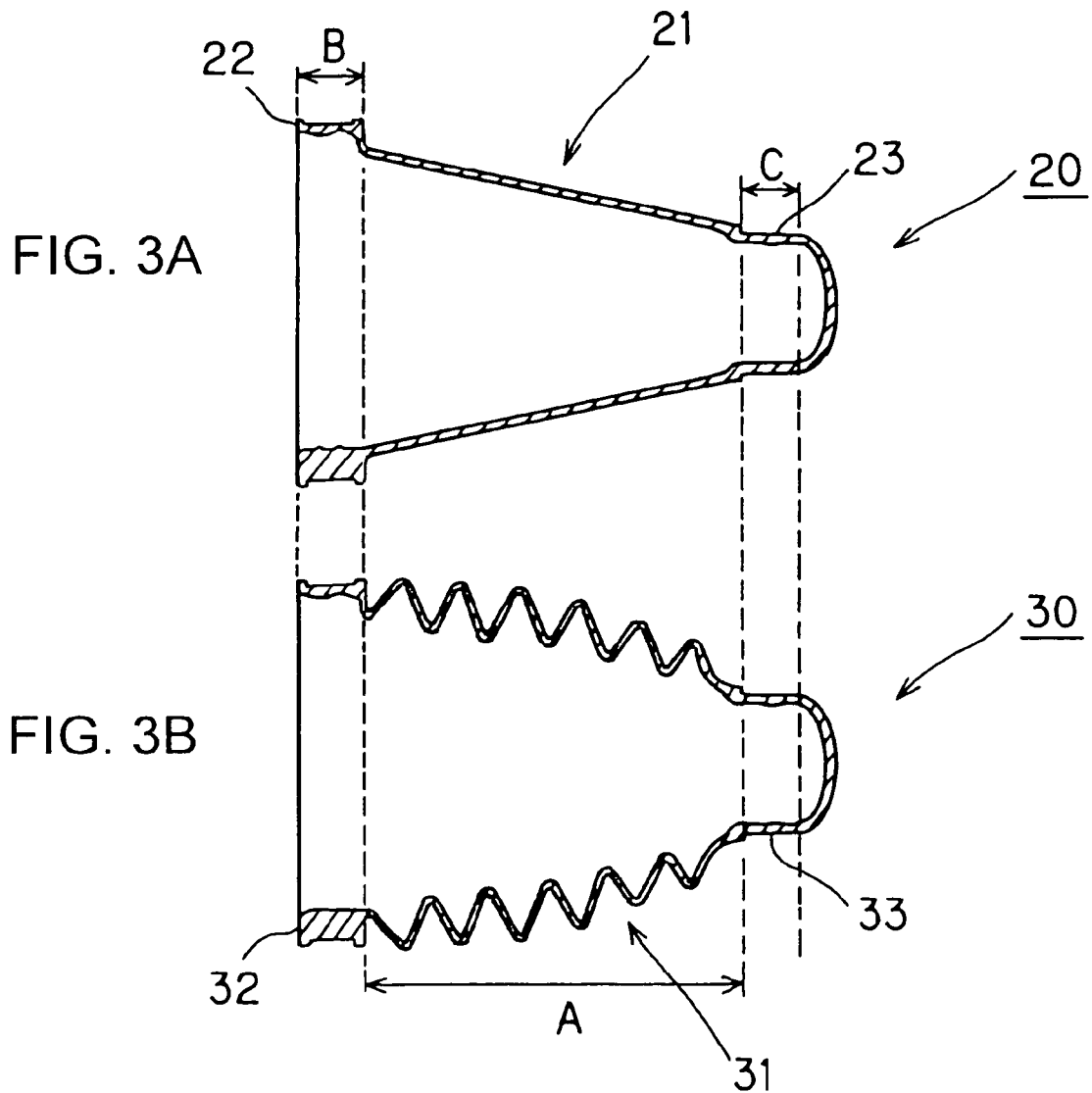

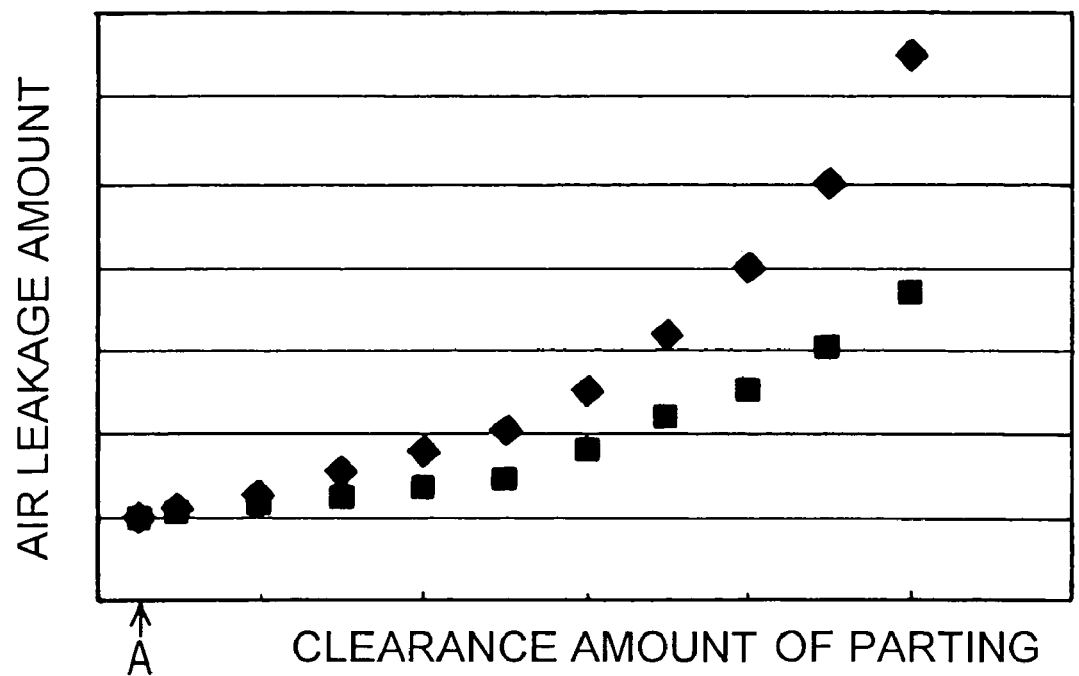
FIG. 5  ◆ CIRCULAR SHAPE
■ OVAL SHAPE

◆ CIRCULAR SHAPE
■ OVAL SHAPE

SIXTH CREST PART ELONGATION RATE

CLEARANCE AMOUNT OF PARTING

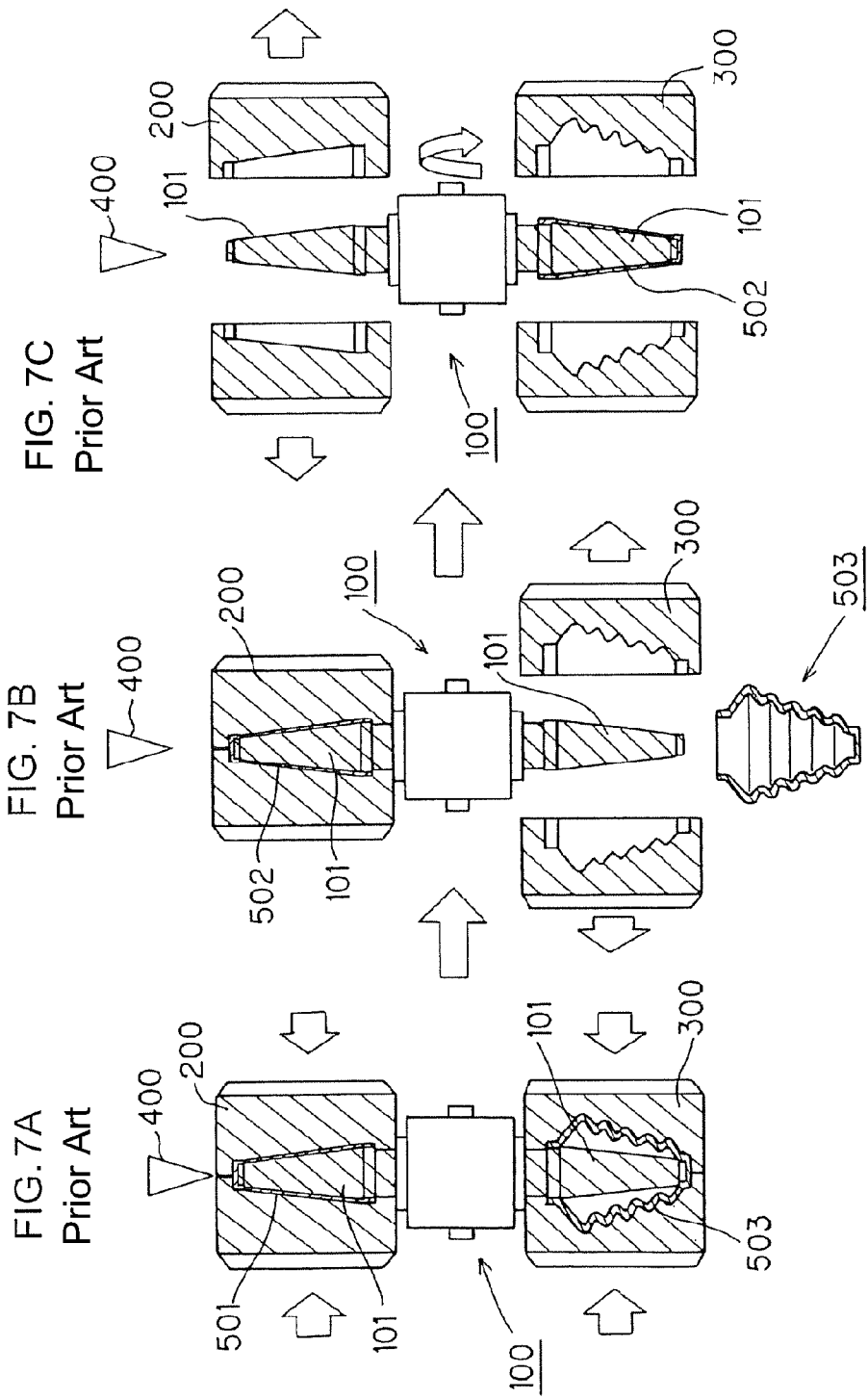

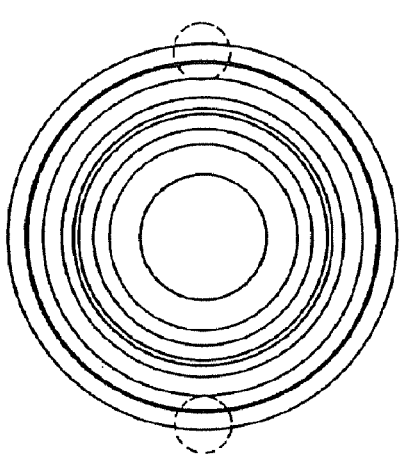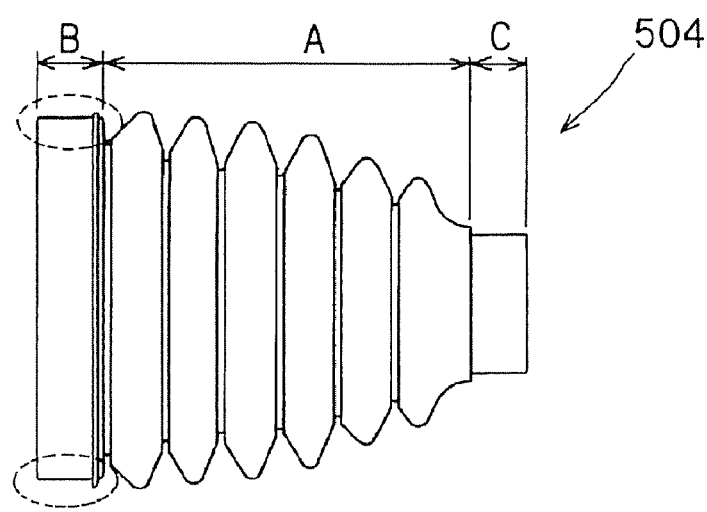
FIG. 8A
Prior Art
FIG. 8B
Prior Art

METAL MOLD FOR BLOW MOLDING

CROSS-REFERENCE TO RELATED APPLICATIONS

This application is a National Stage of International Application No. PCT/JP2006/310638, filed May 29, 2006. This application claims the benefit of Japanese Patent Application No. 2005-174046, filed Jun. 14, 2005. The disclosures of the above applications are incorporated herein by reference.

FIELD

The present disclosure relates to a metal mold for blow molding, more particularly to a metal mold for blow molding an elastomer article used as a constant velocity joint boot.

BACKGROUND

The statements in this section merely provide background information related to the present disclosure and may not constitute prior art.

A constant velocity joint is structured such as to joint an input shaft and an output shaft which are provided so as to change an intersecting angle therebetween, in such a manner that a constant velocity rotation can be transmitted to the output shaft from the input shaft, and a housing (an outer race) accommodating a bearing part is provided in one shaft. In order to seal a lubricant (generally, a grease) inside of the joint, and prevent a water, a muddy water or the like from making an intrusion into the inside of the joint, a constant velocity joint boot is installed. The constant velocity joint boot has an elastically deformable bellows part, a large-diameter cylinder part formed in one end in an axial direction of the bellows part, and a small-diameter cylinder part formed in the other end in an axial direction of the bellows part, and is structured such that the large-diameter cylindrical part is fixed to a housing, and the small-diameter cylindrical part is fixed to the other shaft. Further, there has been developed a constant velocity joint boot made of a thermoplastic resin for the purpose of a weight saving.

As a method of manufacturing an article corresponding to an intermediate product of the boot, there has been known an injection blow molding. The injection blow molding is a method of molding a parison in accordance with an injection molding and executing a blow molding after stabilizing a shape of the parison. A description will be given of a representative example of the injection blow molding with reference to FIG. 7.

An apparatus used for the injection blow molding is provided with a rotating body 100 having a core cylinder 101 in each ends, as shown in FIG. 7. First, a first outer mold 200 for an injection molding is closed with respect to the core cylinder 101, and a thermoplastic-elastomer 501 in a fluid state is injected into a cavity formed by the core cylinder 101 and the first outer mold 200 by an injection mechanism 400 (FIG. 7A). When a temperature of the thermoplastic-elastomer within the cavity is decreased, a shape is stabilized at a certain degree, and a parison 502 is molded (FIG. 7B). Thereafter, the first outer mold 200 is released while the parison 502 has a certain degree of retention heat, and the rotating body 100 is rotated at 180 degree (FIG. 7C). Further, a blow-up is executed by closing a second outer mold 300 for blow molding in a state in which the parison 502 is attached to the core cylinder 101, and an article 503 is molded (FIG. 7D). Thereafter, the second outer mold 300 is released, and the article 503 is released from the core cylinder 101 (FIG. 7E).

The manufacturing method described here is a manufacturing method (a hot parison method) of executing the blow-up by utilizing the retention heat at a time of injection molding the parison, however, there is a manufacturing method (a cold parison method) of executing the blow-up by cooling until the shape of the parison is sufficiently stabilized and thereafter reheating the parison.

It is possible to obtain a constant velocity joint boot 504 corresponding to a final product by cutting a leading end part of the article 503 formed as mentioned above. FIGS. 8A and 8B are schematic views of the constant velocity joint boot, in which FIG. 8A is a top elevational view and FIG. 8B is a front elevational view. The constant velocity joint boot 504 is generally constituted by a bellows-shaped body part, and cylindrical parts in both ends thereof. In this case, the cylindrical parts in both ends are formed at a time of injection molding, and are fitted into the second outer mold 300 in such a manner as to be prevented from being deformed at a time of the blow molding. On the contrary, the body part is shaped at a time of the blow molding. In other words, in FIG. 8, the constant velocity joint boot 504 is structured such that a range shown by reference symbol A (the body part) is shaped in accordance with the blow molding, and a range shown by reference symbol B (the large-diameter cylindrical part) and a range shown by reference symbol C (the small-diameter cylindrical part) are shaped in accordance with the injection molding.

In this case, since an annular end surface part (an annular shoulder part between the body part and the large-diameter cylindrical part) in an axial direction of the large-diameter cylindrical part of the parison 502 seals between the core cylinder 101 and the second outer mold 300 so as to prevent a leakage of a blow air at a time of the blow-up, it is not necessary to completely contact an inner peripheral surface of the second outer mold 300 and an outer peripheral surface of the large-diameter cylindrical part so as to clamp mold, but a predetermined clearance X is provided between the inner peripheral surface of the second outer mold 300 and the outer peripheral surface of the large-diameter cylindrical part as shown in FIG. 10. However, if the clearance X is too large (FIG. 10B), a gap is generated between the core cylinder 100 and the parison 502 at a time of the blow-up (FIG. 10C), and the blow air leaks from the gap. Accordingly, a sufficient pressure is not applied to the inner surface of the parison so as to cause a blow short. Therefore, in the case of taking the blowing performance into consideration, it is necessary to design the second outer mold in such a manner that the clearance X becomes as small as possible (it is desirable to design the metal mold in such a manner that the clearance X comes to 0 in a state of mold clamping the parison). However, it is hard to design while accurately forecasting the clearance X for the reasons (1) an expansion and a deformation of the resin due to a heating in the case that a reheating step of the parison is provided, (2) a difference of a linear expansion amount of the metal mold due to a difference between an assumed temperature in a design stage and a temperature at a time of actually molding, (3) a positioning accuracy of the blow metal mold and the core cylinder, (4) an attaching accuracy of the mold and the like.

On the contrary, if the clearance X is small, a mold biting is generated at a parting line P at a time of mold clamping the second outer mold 300 as shown in FIG. 9 (a part surrounded by a middle point line in FIG. 9). If the mold biting is generated, the large-diameter cylindrical part of the article is deformed, and a grease seal performance at a time of being used as the constant velocity joint boot is lowered. Accordingly, in order to prevent the mold biting, it is necessary to set the clearance X as large as possible. However, if the clearance X is large, the blow air leaks as mentioned above, and the blowing performance is lowered. Further, it is impossible to comply with a product specification. In other words, if the clearance X is made small for increasing the blowing performance, the mold biting is generated, and if the clearance X is made large for preventing the mold biting, the blowing performance is lowered.

SUMMARY

The present teachings were made for solving the problem of the prior art mentioned above, and an object of the present disclosure is to provide a metal mold for blow molding which may prevent a mold biting while maintaining a blowing performance and may form a thermoplastic-elastomer article having a stable shape.

In order to achieve the object mentioned above, in accordance with the present disclosure, there is provided a blow molding metal mold for blow molding a parison having a cylindrical end part, in which the blow molding metal mold is provided with an annular loosely surrounding part loosely surrounding an outer peripheral surface of the cylindrical end part, wherein a clearance between an outer peripheral surface of the cylindrical end part and an inner peripheral surface of the loosely surrounding part at a parting line of the metal mold is larger than a clearance at the other parts than the parting line.

An end part of the parison is a part (a cylindrical part of an article) to which a final shape is previously applied at a time of injection molding the parison, and is mold clamped in a state of having such a predetermined clearance (a gap between an outer peripheral surface of the end part of the parison and an inner peripheral surface of the loosely surrounding part of the metal mold) as to prevent a leakage of a blow air from being generated at a time of the blow molding. However, if the clearance is small, a mold biting is generated at the parting line of the metal mold at a time of the mold clamping. On the contrary, if the clearance is large, the leakage of the blow air is generated, and a blowing performance is lowered. Further, it is possible to prevent the mold biting at a time of the mold clamping while maintaining the blowing performance, by partly enlarging the clearance only at the parting line part in which the mold biting tends to be generated. Accordingly, it is possible to prevent the deformation of the large-diameter cylindrical part of the article.

It is preferable that an outer peripheral shape of the end part is formed in a circular shape, an inner peripheral shape of the loosely surrounding part is formed in an oval shape, and a long diameter of the oval shape passes through a part on and near the parting line of the metal mold.

An outer peripheral shape of the end part (the cylindrical part) after the blow molding is structured such that an outer diameter on and near the parting becomes larger than an outer diameter in the other parts in correspondence to the change of the clearance, by an air pressure at a time of the blow molding. However, since an amount of the clearance is changed little by little by forming the inner peripheral shape of the loosely surrounding part in the oval shape as mentioned above, a change of the outer peripheral shape becomes smooth so as not to generate any problem on an outer appearance. Further, if the amount of the clearance is set in such a manner that the change of the outer peripheral shape comes to within a dimensional tolerance of a product specification, no problem is generated in the light of a product function.

As mentioned above, in accordance with the present disclosure, it is possible to mold a thermoplastic-elastomer article having a stable shape.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIG. 3 is a schematic vertical cross sectional view of an article and a parison;

FIG. 5 is a graph showing a relation between a clearance amount of a parting and an air leakage amount;

FIG. 7 is an explanatory view of an injection blow molding step in accordance with a prior art;

FIG. 8 is a schematic outline view of a constant velocity joint boot in accordance with a prior art;

DETAILED DESCRIPTION

Figure 1:
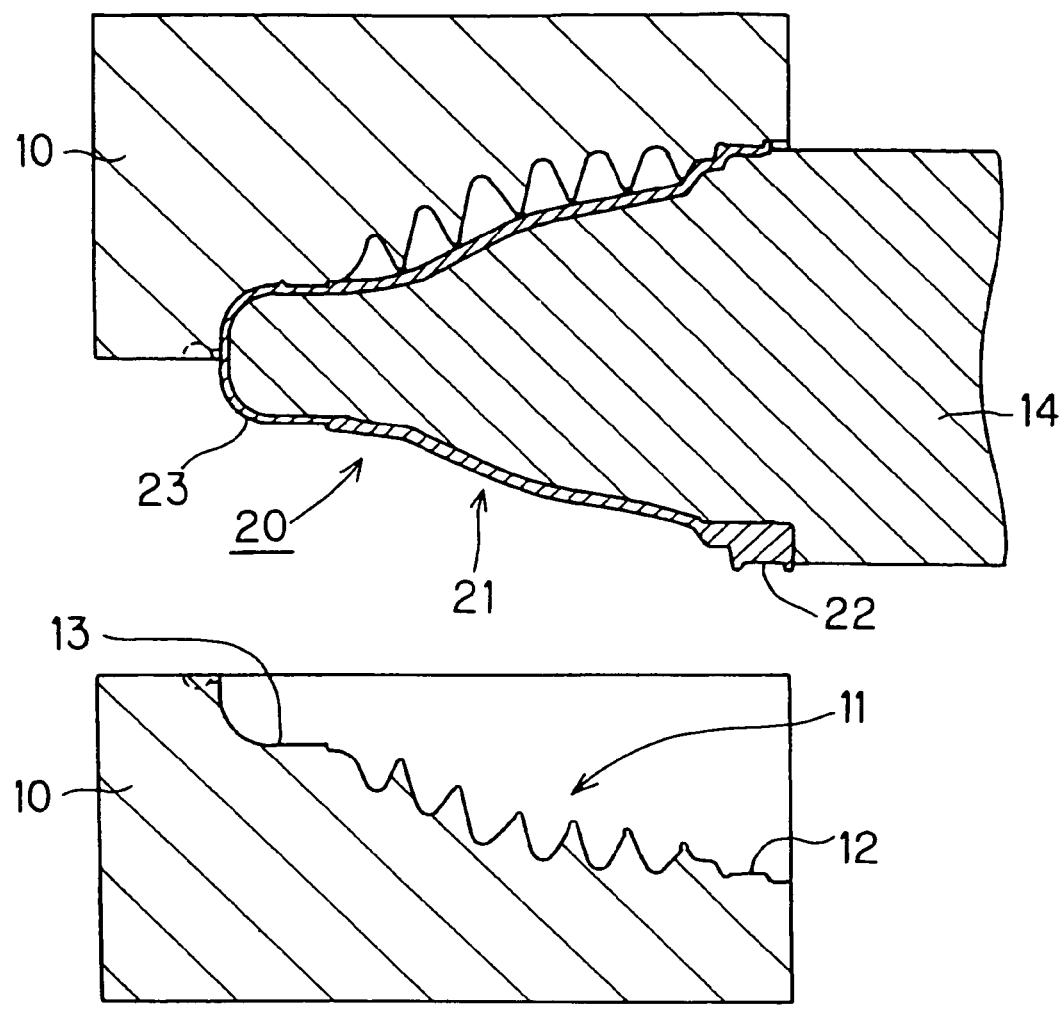
FIG. 1 is a schematic cross sectional view of a metal mold for blow molding in accordance with an embodiment of the present disclosure.

The following description is merely exemplary in nature and is not intended to limit the present disclosure, application, or uses. It should be understood that throughout the drawings, corresponding reference numerals indicate like or corresponding parts and features.

A description will be in detail given below of a best mode for carrying out the present teachings on the basis of an embodiment in an exemplifying manner. In this case, dimensions, materials, shapes, relative layouts and the like of constituting parts described in this embodiment are not in effect that the scope of the disclosure is limited to them except the case that any specific description is given.

A description will be given of a metal mold for blow molding in accordance with an embodiment with reference to FIGS. 1 to 4. A blow molding metal mold 10 in accordance with the present embodiment is a metal mold for blowing up a parison 20 so as to mold an article 30.

A description will be given first of a constant velocity joint. The constant velocity joint is structured such as to joint an input shaft and an output shaft provided so as to change an intersecting angle therebetween in such a manner that a constant velocity rotation may be transmitted to the output shaft from the input shaft, and is provided with a housing (an outer race) accommodating a bearing part in one of these shafts. In order to seal a lubricant (generally, a grease) in an inner part of the joint, and prevent a water, a muddy water or the like from making an intrusion into the inner part of the joint, a constant velocity joint boot is installed.

Figure 2:
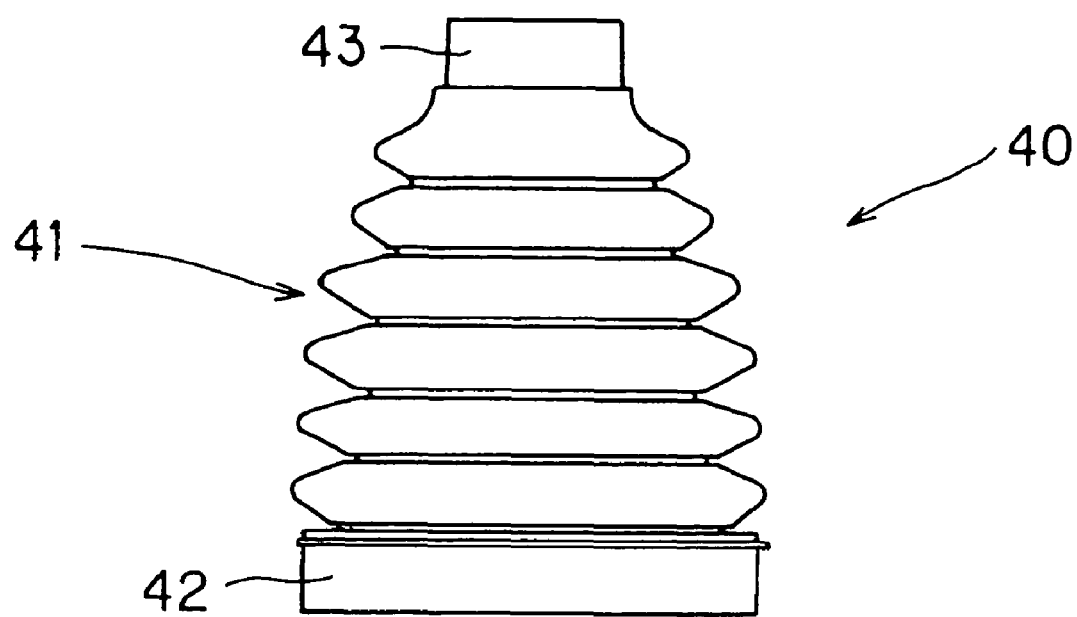
FIG. 2 is a schematic outline view of a constant velocity joint boot.

Next, a description will be given of the constant velocity joint boot, an article corresponding to an intermediate product of the constant velocity joint boot and a parison with reference to FIGS. 2 and 3. FIG. 2 is an outline view of the constant velocity joint boot corresponding to a final product. FIG. 3A is a vertical cross sectional view of the parison. FIG. 3B is a vertical cross sectional view of the article. As shown in FIG. 2, a constant velocity joint boot 40 has an elastically deformable bellows part 41, a large-diameter cylindrical part 42 formed in one end in an axial direction of the bellows part 41, and a small-diameter cylindrical part 43 formed in the other end in the axial direction, the large-diameter cylindrical part 42 is fixed to a housing, and the small-diameter cylindrical part 43 is fixed to the other shaft. Further, there has been developed a constant velocity joint boot made of a thermoplastic resin, for the purpose of a weight saving.

As shown in FIG. 3A, the parison 20 has a body part 21, a large-diameter cylindrical part 22 formed in one end in an axial direction of the body part, and a small-diameter cylindrical part 23 formed in the other end in the axial direction, and is molded in accordance with an injection molding. As shown in FIG. 3B, the article 30 has a bellows part 31 to which a shape is applied in accordance with a blow molding, a large-diameter cylindrical part 32 formed in one end in an axial direction of the bellows part 31, and a small-diameter cylindrical part 33 formed in the other end in the axial direction. In FIG. 3, a range shown by reference symbol A corresponds to the body part 21 of the parison 20 and the body part 31 of the article 30, and the body part 31 corresponds to a part molded in accordance with the blow molding in the parison 20. Further, a range shown by reference symbols B and C corresponds to the large-diameter cylindrical part 22 and the small-diameter cylindrical part 23 of the parison 20 and the large-diameter cylindrical part 32 and the small-diameter cylindrical part 33 of the article 30, and is constituted by a part molded in a stage of injection molding of the parison 20. In other words, the large-diameter cylindrical part 42 of the constant velocity joint boot 40 corresponding to the final product is molded in a stage of the injection molding of the parison 20. Further, a closed part in a leading end of the small-diameter cylindrical part 33 of the article 30 is a part cut after the blow molding.

Figure 4A:
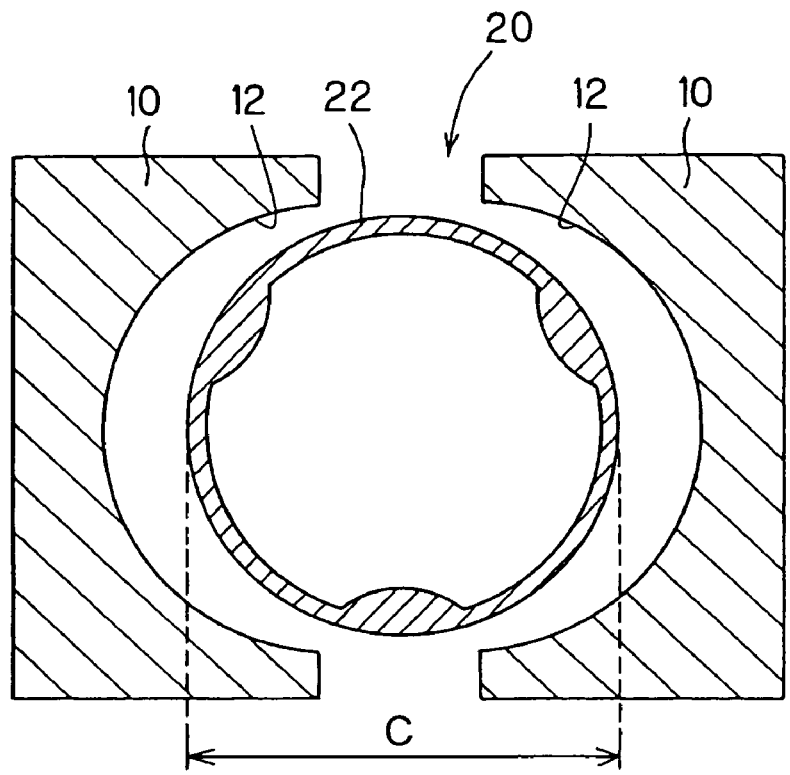
FIG. 4 is a schematic cross sectional view of a metal mold for blow molding in accordance with an embodiment of the present disclosure.
Figure 4B:
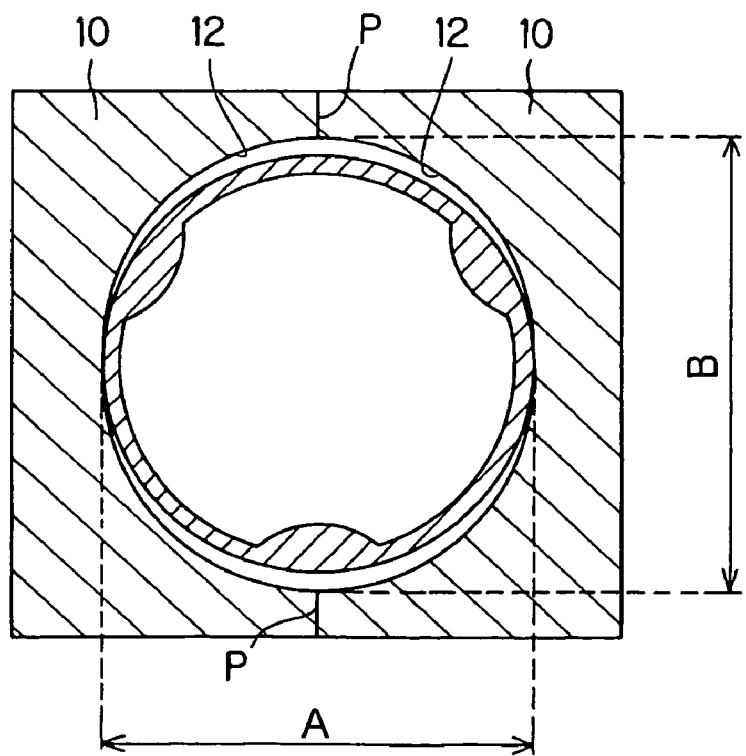

Next, a description will be given of a metal mold for blow molding in accordance with the present embodiment with reference to FIGS. 1 and 4. FIG. 1 is a schematic cross sectional view of the metal mold for blow molding in accordance with the embodiment of the present disclosure. FIG. 4A is a schematic cross sectional view showing a state before mold clamping the parison in the metal mold for blow molding in accordance with the embodiment of the present disclosure. FIG. 4B is a schematic cross sectional view showing a state after mold clamping the parison in the metal mold for blow molding in accordance with the embodiment of the present disclosure. As shown in FIG. 1, the blow molding metal mold 10 in accordance with the present embodiment is constituted by a pair of metal molds sandwiching the parison 20 from both sides so as to mold clamp, and is provided with a shape applying part 11 for applying a bellows shape to the body part 21 of the parison 20, an annular loosely surrounding part 12 for loosely surrounding the large-diameter cylindrical part 22 of the parison 20, and an annular loosely surrounding part 13 for loosely surrounding and fitting with play remaining the small-diameter cylindrical part 23 of the parison 20.

Next, a description will be given of the blow molding of the article 30 by the blow molding metal mold 10 in accordance with the present embodiment. First, the parison 20 which is formed in accordance with the injection molding and is kept being amounted to the core cylinder 14 is first clamped to the blow molding metal mold 10. Further, a blow air is blown in an inner peripheral wall of the body part 21 of the parison 20 from a blowing hole (not shown) provided in the core cylinder 14. On the basis of a blow-off pressure of the blow air, the body part 21 of the parison 20 is contacted to the shape applying part 11 of the blow molding metal mold 10, and the bellows shape is applied to the body part 21. Further, the article 30 having the bellows shape in the body part 31 is obtained by mold releasing from the blow molding metal mold 10 and the core cylinder 14.

In this case, the annular loosely surrounding part 12 of the blow molding metal mold 10 in accordance with the present embodiment is structured such that an inner diameter B passing through the parting line of the metal mold is set larger than an inner diameter A in a direction of 90 degree with respect to the parting line P as shown in FIG. 4. In other words, the inner diameter of the annular loosely surrounding part 12 is set such as to be smallest in the direction of 90 degree with respect to the parting line P, become larger little by little toward the parting line P and become maximum on the parting line P. Accordingly, an inner peripheral shape of the annular loosely surrounding part 12 is formed in such an oval shape that the diameter at the parting line P is largest. On the contrary, an outer diameter C of the large-diameter cylindrical part 22 of the parison 20 is formed in such a circular shape that the outer diameter C is fixed all around the circumference. Accordingly, at the time of the mold clamping of the parison 20, the clearance (the gap) between the outer peripheral surface of the large-diameter cylindrical part 22 of the parison 20 and the inner peripheral surface of the annular loosely surrounding part 12 is smallest in a clearance (a difference between A and C) in the direction of 90 degree with respect to the parting line P, becomes larger little by little toward the parting line P, and becomes largest in a clearance (a difference between B and C) at the parting line P.

Generally, the clearance between the outer peripheral surface of the large-diameter cylinder part of the parison and the inner peripheral surface of the annular loosely surrounding part is set as small as possible for the purpose of preventing the blow air leakage at a time of the blow-up. However, if the clearance is small, the outer mold for blow molding bites a part of the parison at the parting line at a time of the mold clamping, and a burr or the like is generated in the thereafter article. Since the large-diameter cylinder part of the constant velocity joint boot is attached to the housing in the shape applied at a time of the injection molding of the parison, the attaching accuracy is lowered if the large-diameter cylinder part is deformed by the burr or the like, and the grease seal performance is lowered. On the other hand, if the clearance is made large, the leakage of the blow air is generated and the blowing performance is lowered, so that the bellows shape may not be sufficiently applied, and deflects from the product specification.

Accordingly, in the blow molding metal mold 10 in accordance with the present embodiment, the mold biting at a time of the mold clamping is prevented by enlarging the clearance on and near the parting line P so as to set a part forming a runout. On the other hand, in the other parts than the part on and near the parting line P, by making the clearance small, the seal performance at a time of the mold clamping is increased, and the leakage of the blow air at a time of the blow-up is prevented and the blowing performance is improved. Accordingly, comparing with the circular metal mold in which the clearance taking the mold biting into consideration is provided uniformly all around the circumference, since the clearance is small in the other parts than the part on and near the parting line P even if the clearance on and near the parting line P is enlarged, it is possible to sufficiently suppress the leakage of the blow air, and it is possible to improve the blowing performance while preventing the mold biting.

Further, the outer peripheral shape of the large-diameter cylinder part 32 of the article 30 after the blow molding is structured such that the diameter on and near the parting line P becomes larger than the outer diameter in the other parts in correspondence to the change of the clearance, by the air pressure at a time of the blow molding. However, since an amount of the clearance is changed little by little, the change of the outer peripheral shape of the large-diameter cylinder part 32 becomes smooth and does not generate any problem in an outer appearance. Further, if the amount of the clearance is set in such a manner that the change of the outer peripheral shape comes within the dimensional tolerance of the product specification, no problem is generated in the light of the product function.

In this case, FIG. 5 shows a result of experiment obtained by comparing an oval metal mold with a circular metal mold, about a relation between the clearance amount of the parting line and the air leakage amount. The clearance of the metal mold of the oval mold is set to be always fixed to 0 in the direction of 90 degree with respect to the parting line, and to become maximum at the parting line. The metal mold of the circular mold is provided uniformly with the same amount of clearance as the parting line of the oval metal mold all around the circumference. Reference symbol A in FIG. 5 shows a state in which in FIG. 4B dimensions A and B are identical and a difference between dimensions A and C is 0 (the clearance is 0). As shown in FIG. 5, it is known that even if the clearance amount of the parting is the same, the leakage amount is smaller in the case that the large-diameter cylinder part is formed in the oval shape in comparison with the case that it is formed in the circular shape.

Figure 6A:
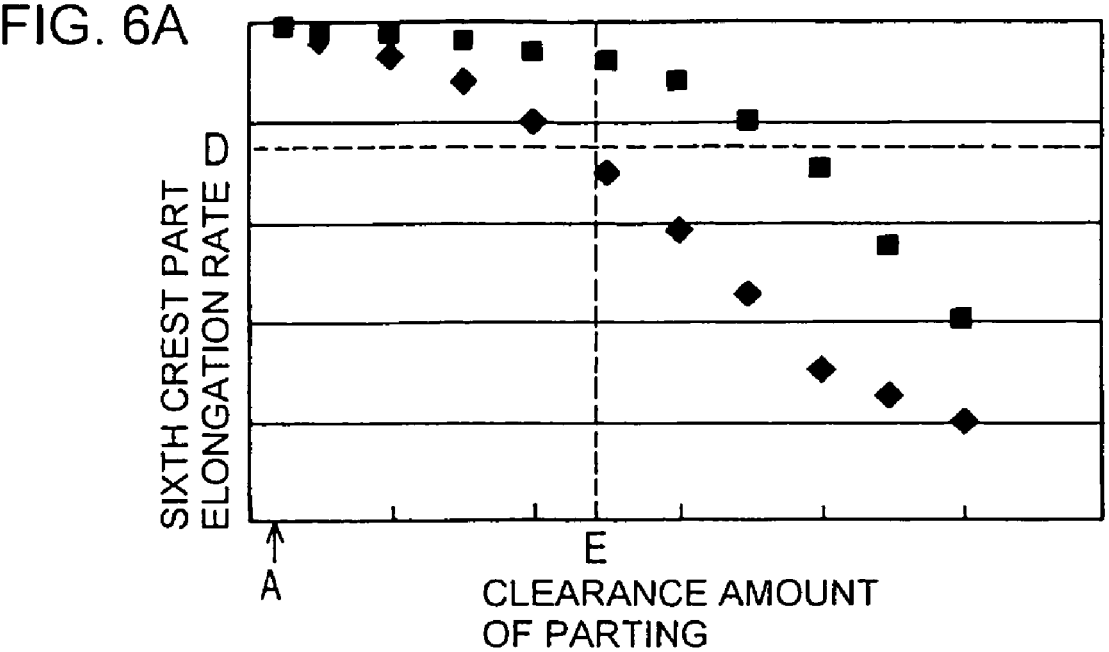
FIG. 6 is a graph showing a relation between the clearance amount of the parting and an elongation rate of a crest part of a bellows shape part.
Figure 6B:
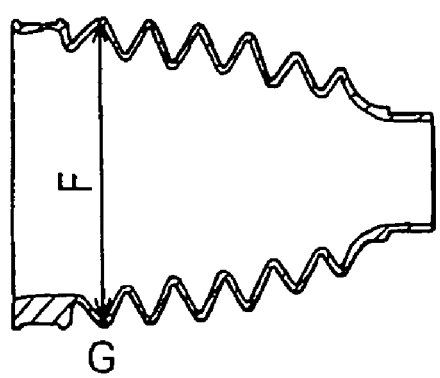
Figure 9:
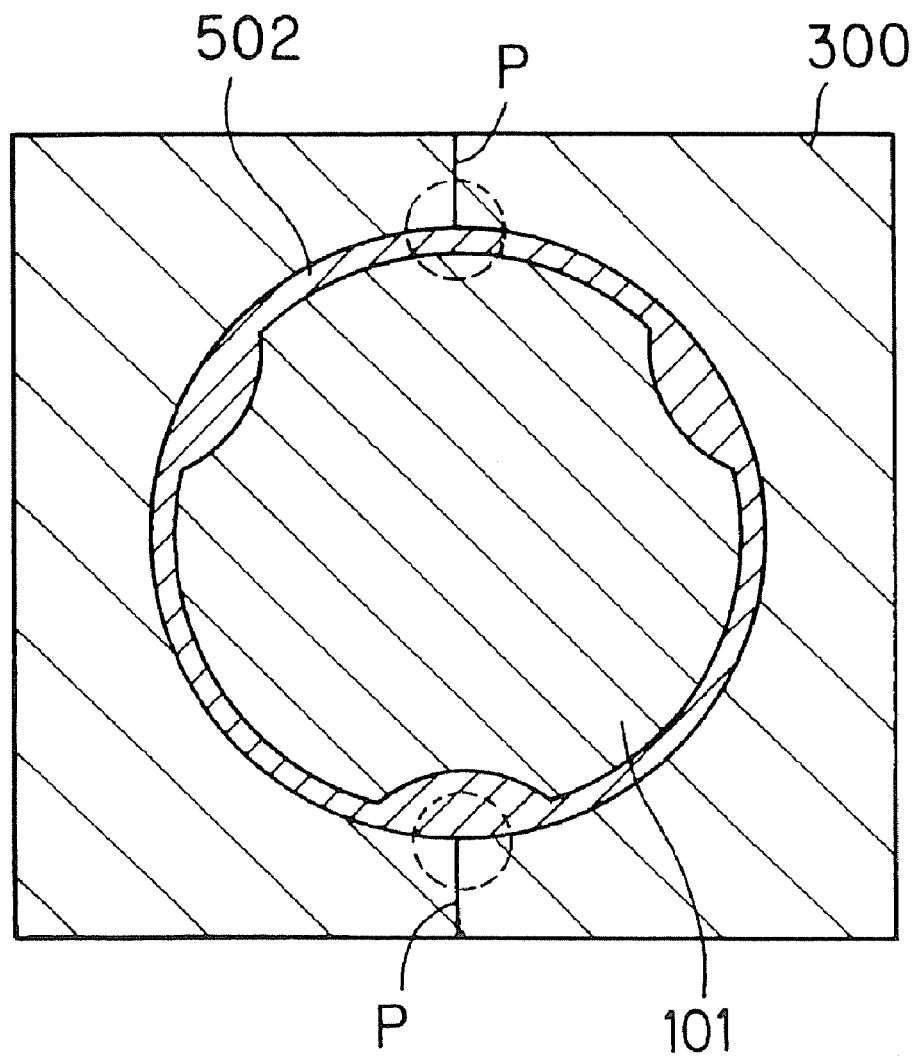
FIG. 9 is a schematic cross sectional view of a metal mold for blow molding in accordance with a prior art.
Figure 10A:
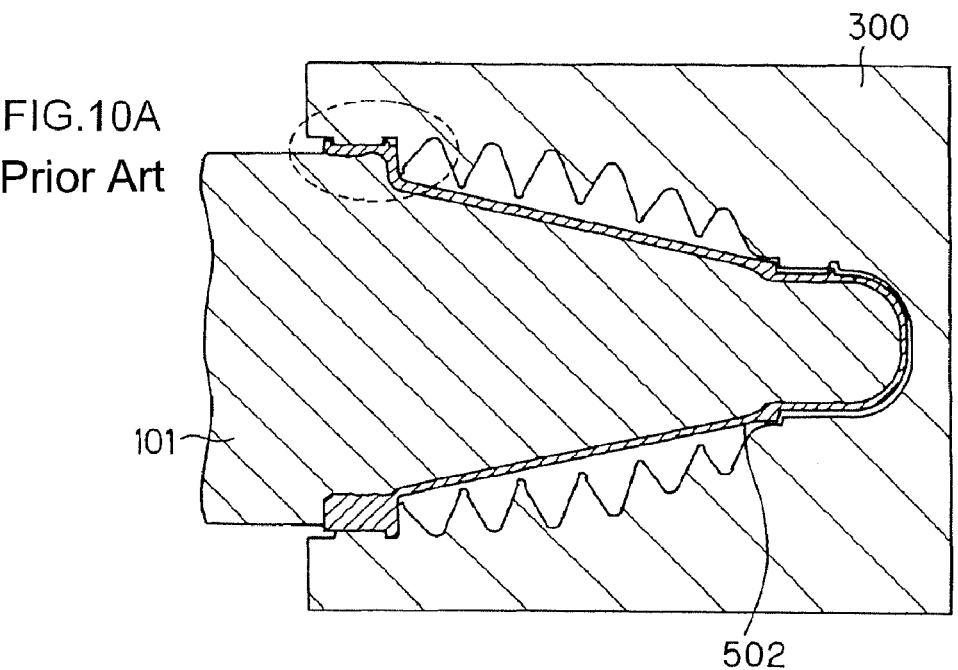
FIG. 10 is a schematic cross sectional view of the metal mold for blow molding in accordance with the prior art.
Figure 10B:
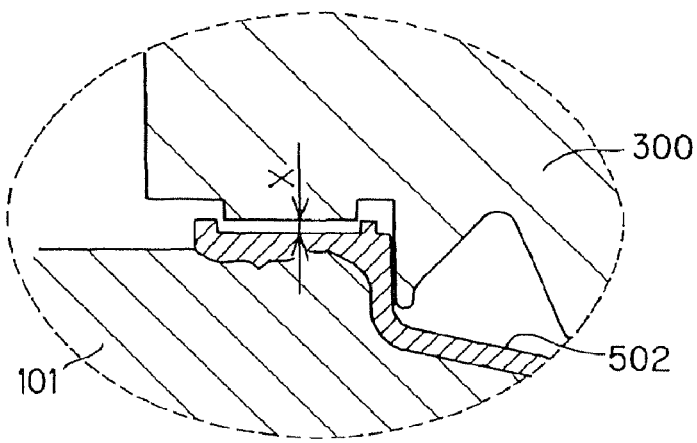
Figure 10C:
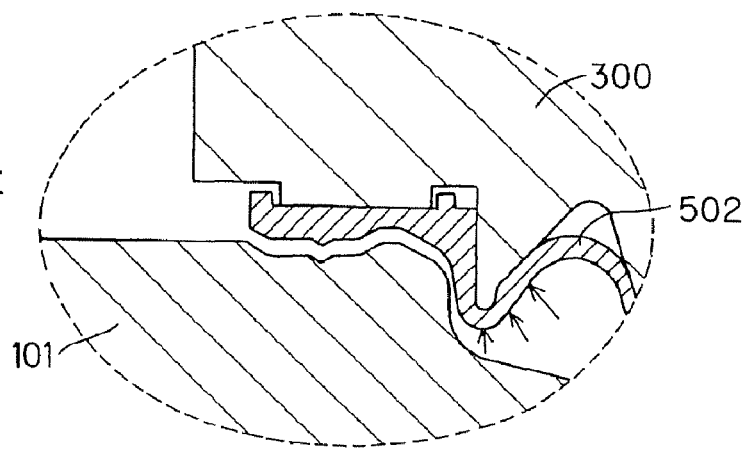

Further, FIG. 6 shows a result of experiment obtained by comparing the oval metal mold with the circular metal mold, about an elongation rate of a crest part G (a sixth crest: a sixth crest part from the small-diameter cylinder part side) of the bellows-shaped part adjacent to the large-diameter cylinder part with respect to the dimension of the blow molding metal mold. In this case, "elongation rate" means a ratio between the product dimension after the blow molding and the metal mold dimension, and becomes maximum to 100% in the case that the product dimension coincides with the metal mold dimension. Further, reference symbol D in FIG. 6 denotes a product specification lower limit value, reference symbol E denotes a mold biting generation boundary value, reference symbol F denotes an elongation rate measured part, respectively. With regard to this, there is obtained a result that the elongation rate is higher in the case that the large-diameter cylinder part is formed in the oval shape in comparison with the case that it is formed in the circular shape even if the clearance amount of the parting is the same, and the product specification may not be satisfied in case of such the clearance amount that the mold biting is not generated in the circular shape.

On the basis of the results mentioned above, in order to prevent the mold biting, the annular loosely surrounding part of the blow molding metal mold is preferable in the case that the inner diameter at the parting line is 0.05 to 5.0 mm larger than the inner diameter in the direction of 90 degree with respect to the parting line, and is desirable to be equal to or less than 1.0 mm, taking the product dimension specification into consideration.

What is claimed is:

1. A blow molding metal mold for blow molding a parison having a cylindrical end part, the blow molding metal mold comprising an annular loosely surrounding part for loosely surrounding an outer peripheral surface of said end part, wherein a clearance between an outer peripheral surface of said end part and an inner peripheral surface of said loosely surrounding part at a parting line of the metal mold is larger than a clearance at the other parts than the parting line.

2. The blow molding metal mold as claimed in claim 1, wherein an outer peripheral shape of said end part is formed in a circular shape, an inner peripheral shape of said loosely surrounding part is formed in an oval shape, and a long diameter of said oval shape passes through a part on and near the parting line of said metal mold.

* * * * *